March 10, 1970  W. K. J. PEARSON  3,499,306
MEASUREMENT OF THE SHAPE AND FLATNESS
OF SHEET OR STRIP MATERIAL
Filed July 6, 1966  5 Sheets-Sheet 1

Inventor
William Kenneth Jameson Pearson

By Peck & Peck
ATTORNEYS

United States Patent Office 3,499,306
Patented Mar. 10, 1970

3,499,306
MEASUREMENT OF THE SHAPE AND FLATNESS OF SHEET OR STRIP MATERIAL
William Kenneth Jamieson Pearson, Amersham, England, assignor to The British Aluminium Company Limited, London, England, a company of Great Britain
Filed July 6, 1966, Ser. No. 563,173
Claims priority, application Great Britain, July 9, 1965, 29,224/65
Int. Cl. B21b 37/04
U.S. Cl. 72—17                    18 Claims

ABSTRACT OF THE DISCLOSURE

This invention relates to a method and apparatus for measuring the flatness or shape of sheet or strip material under tension in which at least two floating members supported by fluid pressure in spaced relationship to a fixed member are urged into engagement with the sheet or strip material at spaced locations and the displacement of each floating member relative to its associated fixed member or the fluid pressure is measured.

---

Figure 1:
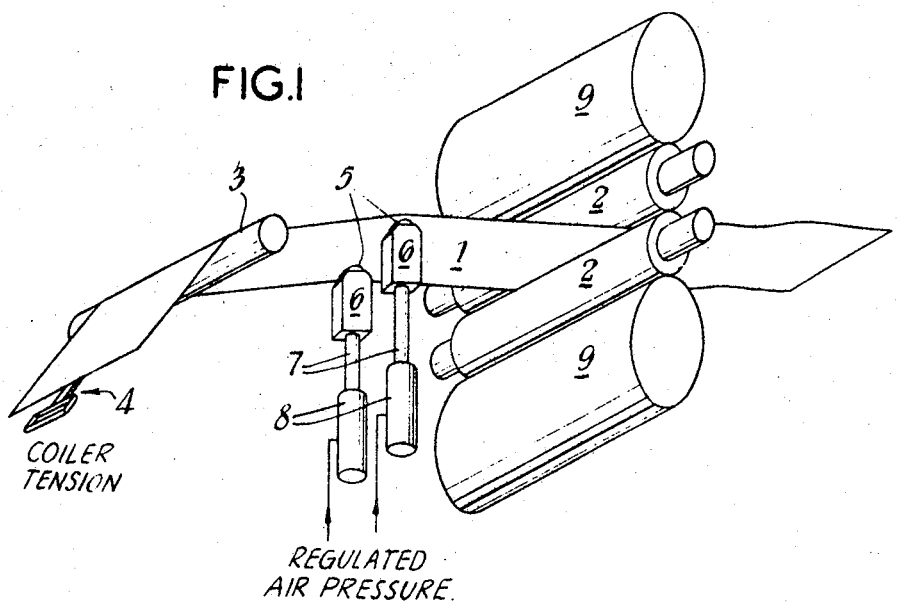

This invention relates to improvements in the measurement of the shape of sheet or strip material and includes controlling such shape. The term "shape" refers to deviations of the surface in more than one direction from flatness, i.e., the position of the surface of the sheet or strip relative to a reference plane. Sheet or strip may be considered to be of good shape when it does not possess a double curvature. Usually, the cross-sectional shape is uniform throughout the length of the sheet or strip but the sheet or strip may taper along its length whilst still being of good "shape."

In the manufacture of metal sheet or strip by passing the material through a pair of co-operating rolls in a rolling mill it is usual to provide at least one of the rolls with a cambered surface, initially by appropriately grinding the roll and additionally by superposing a thermal camber thereon, in order to compensate for deflections of the rolls due to the separating force exerted by the rolled material. Thus each cambered roll has a surface which is curvilinear in a plane containing the roll-axis, is circular in a plane transverse to the roll-axis, is generally symmetrical about a transverse plane passing through the centre of length of the roll-axis and has its greatest diameter in the last-mentioned plane when at its working temperature. During the rolling operation the thermal camber of the cambered rolls surface is controlled by controlling the temperature gradient existing in the rolling mill and the flatness or shape of the sheet or strip entering the bite of the co-operating rolls is retained or improved, as required according to the shape of the at least initially cambered surfaces of the rolls at the bite and this shape depends upon the initial camber of the surfaces of the co-operating rolls and the reactionary forces exerted on these surfaces at the bite by the material to deform these surfaces. These reactionary forces in turn depend upon the screw-down force applied to urge the rolls towards each other or other forces applied to bend the rolls, the friction influenced by lubrication of the roll surface and the tension (if any) applied to the sheet or strip. The roll surface friction is usually substantially constant during the rolling operation and is difficult to vary during such operation. The remaining factors, namely the shape of the roll camber, the screw-down force and the sheet or strip tension (if any) are capable of being varied during a rolling operation and are hereinafter referred to as the "controlling factors."

It is desirable that the surface of sheet or strip emerging from the co-operating rolls of a rolling mill should be of good shape but it is frequently found that this is not the case and this defect is particularly undesirable in strip material when it is too severe to be corrected by subsequent flattening operations. Hitherto, it has been customary to assess the flatness or shape of the sheet or strip by visual inspection in the absence of a satisfactory instrument to measure it continuously during rolling, and the use of tension on the sheet or strip and high rolling speeds has made it increasingly difficult even for highly skilled operators to assess the flatness or shape and take the correct remedial action.

We have previously proposed a method of controlling the flatness or shape of metal sheet or strip produced by passing the material through the bite of a pair of co-operating rolls in a rolling mill which comprises applying at least two rollers or the like in nonslip frictional contact with the surface of the sheet or strip advanced from the bite at locations spaced transversely of the direction of advancement of the sheet or strip from the bite, so as to be driven by such advancement and modifying at least one of the controlling factors in the sense to maintain constant the angular velocity imparted to one roller relative to that imparted to the other roller.

We have also previously proposed apparatus for carrying into effect the method according to the immediately preceding paragraph which apparatus comprises at least two rollers adapted to contact the surface of the sheet or strip in a nonslip frictional manner at spaced locations so as to be frictionally driven thereby and means responsive to the difference between the angular velocities imparted to the rollers to provide a signal having a magnitude which is a function of such difference.

It is usual for the sheet or strip material leaving the bite of the co-operating rolls to be placed under tension and this tension is frequently sufficient to pull the strip flat and give it the appearance of being of good shape. It is not obvious that, in this tensioned condition, differences in length, revealed in the shape of the relaxed strip, may be stored as tension differences and that these tension inequalities can be used to provide a measure of the shape of the material.

We have found that a force applied to the strip and having at least a component normal to the general plane of the strip will locally deflect the strip out of the general plane of the strip to a greater or lesser extent according to the magnitude of the applied force and as a function of the local tension existing in the strip. By applying such a force at two or more spaced locations and measuring the resulting deflections a measure of the tension inequalities and hence of the shape of the strip can be obtained. By applying froces of sufficient magnitude to deflect the strip out of the general plane thereof such as materially to reduce the tension inequalities existing therein, the tension inequalities are converted into significant length differences which can be measured when the strip is being advanced relative to the rollers by speed sensing rollers driven by the advance of the strip. Alternatively, the localised resistance of the strip to deflection by the applied forces can be measured to provide a measure of the tension inequalities which exist. Thus, for example, a measure of displacement of the force applying means normal to the general plane of the strip can be obtained.

According to one aspect of the present invention, a method of measuring the flatness or shape of sheet or strip material under tension comprises applying to the sheet or strip at at least two locations a force having at least a component normal to the general plane of the sheet or strip to reduce tension inequalities therein and locally to deflect the sheet or strip and deriving a measure of the resulting deflections of the sheet or strip at said locations.

Preferably, the forces are applied by rollers urged into contact with the sheet or strip and the deflections are measured by measuring the speed of rotation of the rollers driven by the strip or by measuring the displacement of the rollers from a mean position.

The invention also extends to applying the method of either of the two immediately preceding paragraphs to control the flatness or shape of sheet or strip material produced by passing the material through the bite of a pair of co-operating rolls by utilising the measure of the deflections at said locations to modify at least one of the controlling factors defined above in the sense to reduce any difference in the deflection at one location relative to that at the other location.

According to another aspect of the present invention, apparatus for measuring the flatness or shape of sheet or strip material under tension comprises means operable to apply to the sheet or strip at at least two locations a force having at least a component substantially normal to the general plane of the sheet to reduce tension inequalities therein and locally to deflect the sheet or strip and means for deriving a measure of the resulting deflections of the sheet or strip at said locations.

The measuring means preferably comprises a separate roller or the like rotatable means applied at each location in contact with the strip and means for measuring either the angular velocities imparted to the rollers or the displacement of the rollers from a mean position.

The means for urging the rollers against the sheet or strip is desirably pneumatic.

The invention also extends to apparatus according to any one of the three immediately preceding paragraphs together with means responsive to any difference between the localised deflections of the sheet or strip to modify at least one of the controlling factors defined above in the sense to reduce such difference.

Figure 2:
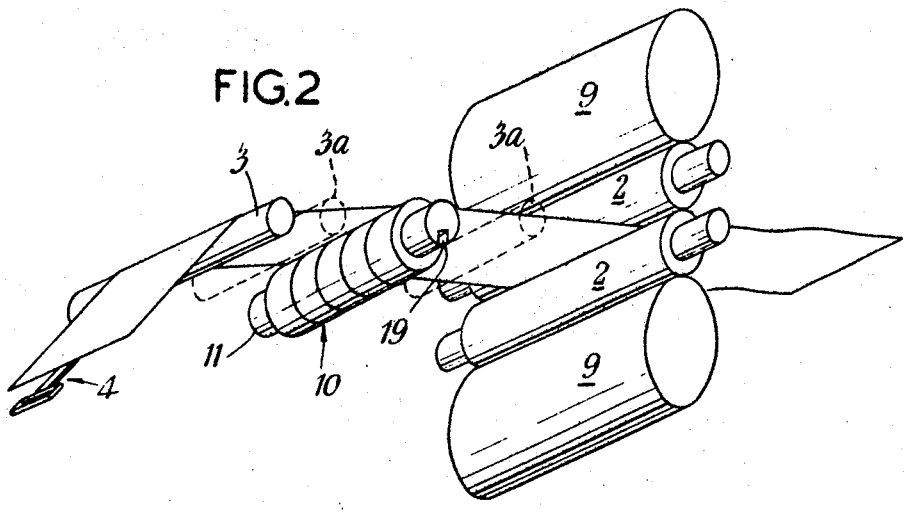
Figure 3:
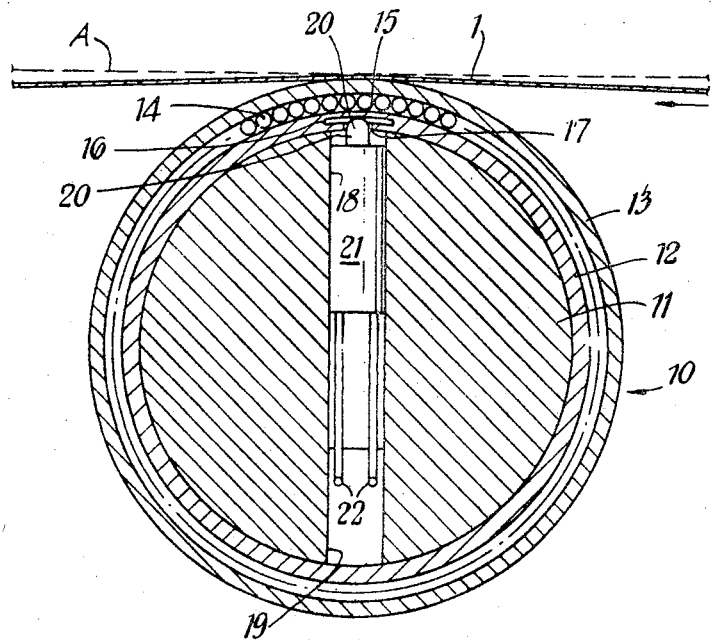
Figure 4:
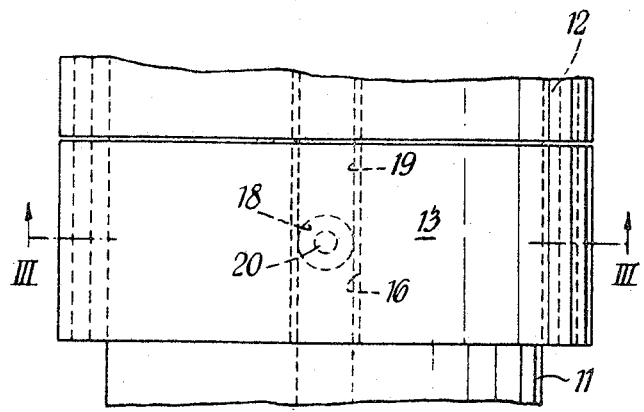
Figure 5:
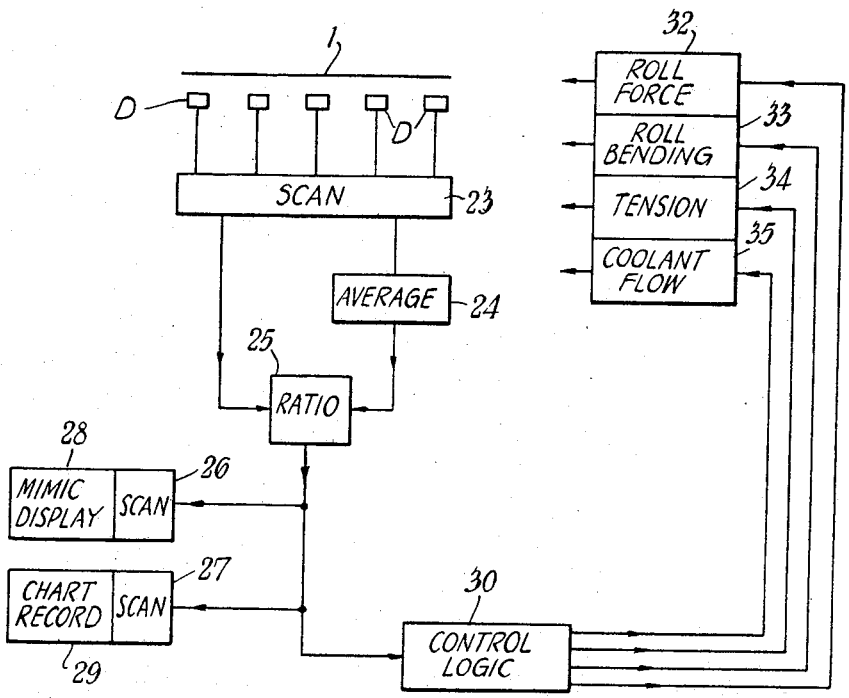
Figure 6:
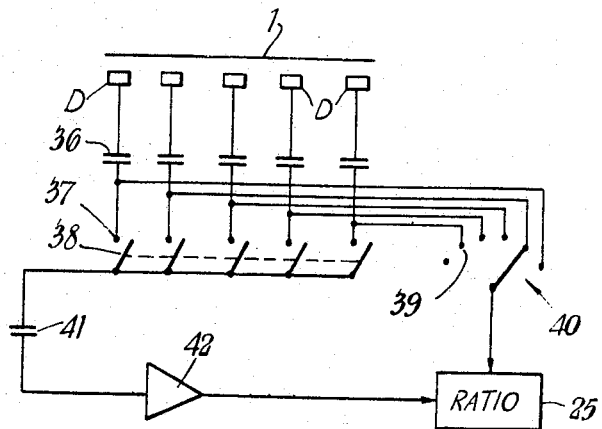
Figure 7:
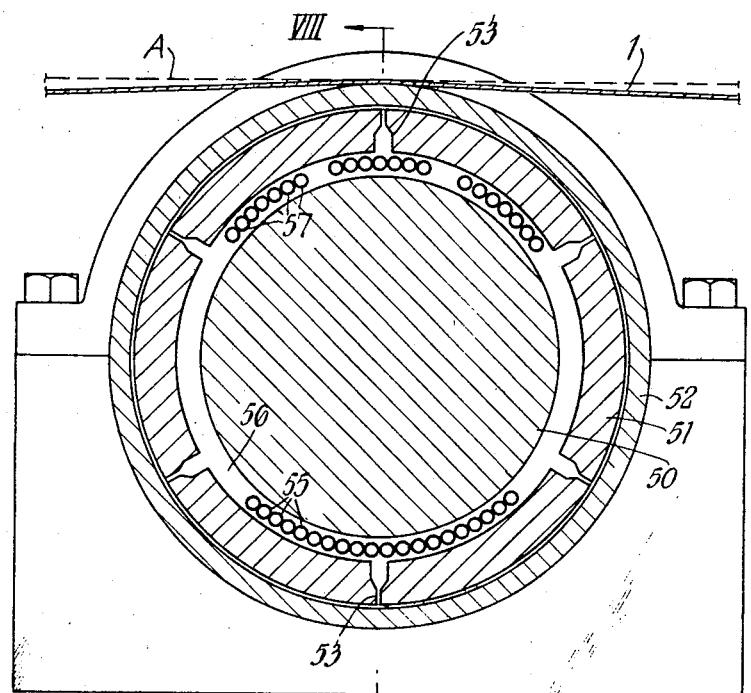
Figure 8:
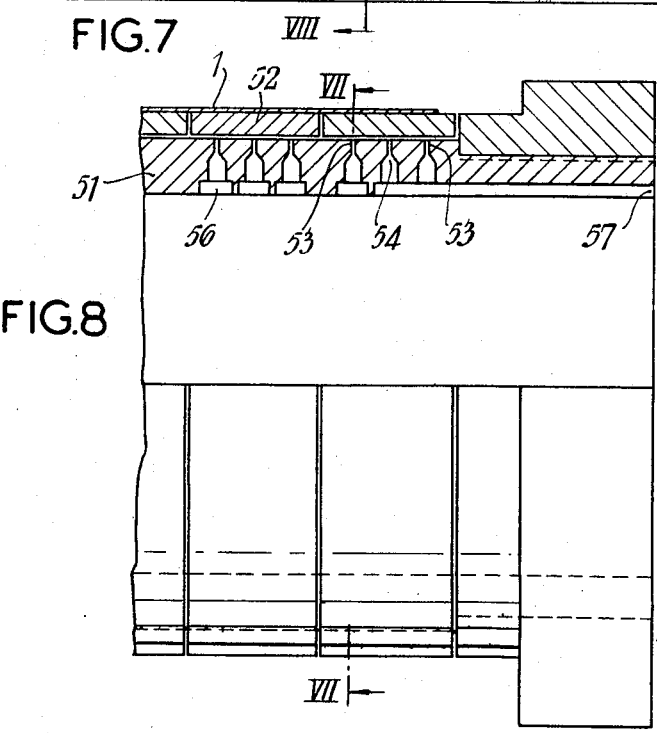
Figure 9:
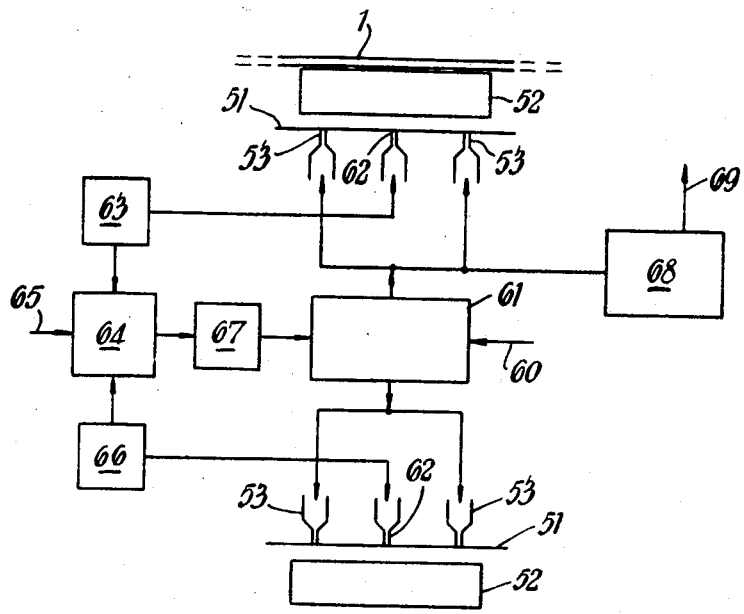
Figure 10:
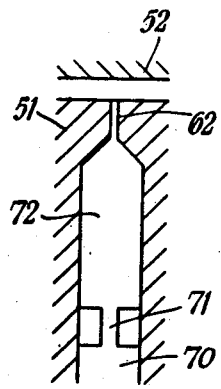
Figure 11:
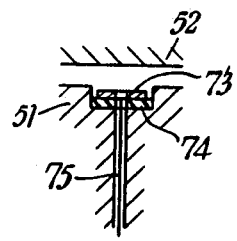
Figure 12:
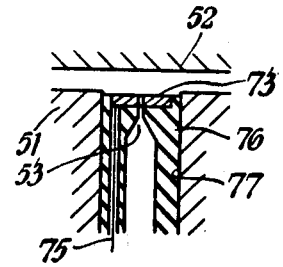

Some embodiments of the invention will now be described by way of example, reference being made to the accompanying drawings in which:

FIG. 1 is a somewhat schematic view illustrative of one embodiment of the invention, FIG. 2 is a view similar to FIG. 1 showing an alternative embodiment, FIG. 3 is a sectional view taken on the line III—III of FIG. 4 illustrating a detail of FIG. 2, FIG. 4 is a fragmentary plan view of the detail shown in FIG. 3, FIG. 5 is a block diagram illustrative of a control system associated with the embodiment of FIGS. 2, 3 and 4, FIG. 6 is a circuit diagram of a part of the system of FIG. 5, FIG. 7 is a section taken on the line VII—VII of FIG. 8 and illustrates a further embodiment of the invention, FIG. 8 is a part section taken on the line VIII—VIII of FIG. 7, FIG. 9 is a schematic block diagram illustrating a further modification, FIG. 10 is a sectional view illustrating a detail of the arrangement shown in FIG. 9, FIG. 11 is a view similar to FIG. 10 illustrating an alternative, and FIG. 12 is a view similar to FIG. 10 illustrating a further alternative.

In the example illustrated in FIG. 1 a metal strip 1 is shown being advanced under tension from the bite of a pair of pressure applying rolls 2. The strip 1 passes over a guide roller 3 and tensioning means is shown very diagrammatically at 4 and can take any suitable form. Thus, for example, the tensioning means 4 may be a driven spool or coiler on to which the strip 1 is wound or it may be the bite of a further pair of pressure applying rolls into which the strip is being drawn. The strip 1 entering the bite of the rolls 2 is shown untensioned to illustrate bad shape although, in practice, it is more likely to be under tension. The untensioned part of the strip 1 is shown with an edge waviness illustrative of double-curvature in the sheet and the effect resulting from the length of the strip varying across its width. Where the strip 1 is under tension, this appearance of bad shape can disappear or be considerably reduced as the strip is drawn taut. Effectively, under these conditions, the bad shape manifests itself as differences in tension in strip across the width thereof, those parts which are longer being under a lesser tension than the other parts. Under such conditions, there can be difficulty in measuring the shape of the strip merely by the application of rollers in nonslip frictional engagement of hte strip in accordance with the disclosure in U.S. Patent No. 3,078,747. This difficulty is overcome or at least minimised by the present invention whereby a force is applied to the strip at at least two locations spaced transversely of its direction of advance, these forces having at least a component acting normal to the general plane of the strip. The effect of such forces is to deform out of the general plane of the strip, and hence effectively increase the length of, those parts subjected to the lesser tensions so that the tension of those parts is increased and the tension inequalities across the width of the strip are materially reduced. Effectively therefore, the inequalities in length which, under tension, are taken up in inequalities in tension, are converted back into inequalities in length by the applied forces. These forces are applied at each location, in this example, by a separate roller 5 bearing against the strip 1 in nonslip frictional contact so as to be driven by the strip, the roller 5 being urged against the strip by suitable means to produce the effect outlined above. In this example, each roller 5 is mounted for rotation in a housing 6 carried on a piston 7 forming part of a piston and cylinder assembly, air being supplied to cylinder 8 under pressure to provide the necessary force. A pneumatic pressure applying system is advantageous as the air, being compressible, allows the rollers 5 to move up and down to take up variations in the deformation produced in the strip according to variations in shape thereof whilst maintaining the necessary driving contact between the rollers 5 and the strip 1.

It will be appreciated that the relative angular velocities imparted to the rollers 5 is a measure of the strip shape. Thus, if the rollers 5 are of the same diameter and the strip 1 is of good shape, the angular velocities imparted to the rollers 5 will be equal and any relative difference in these angular velocities will be a measure of the departure of the strip from good shape. Of course, the rollers 5 need not be of the same diameter in which case good shape will be represented by a predetermined difference in the angular velocities and any departure from such a predetermined difference will be a measure of the bad shape. The angular velocities of the rollers 5 may be measured and compared by any suitable means such as, for example, that described in U.S. Patent No. 3,078,747.

The measurement of the departure of strip from good shape may be used to control and correct the shape of the strip either by a manual operator or automatically by modifying one or more of the controlling factors, namely, the force applied to urge the rolls 2 towards each other, the temperature gradient existing across one or more of the rolls 2 in the direction parallel to the axis thereof, the degree of bending imposed on the rolls 2 so as to modify the roll camber and the strip tension. In this example, the rolls 2 are urged towards each other by further rolls 9 but any other suitable means may be employed as will be appreciated by those skilled in the art. It will also be appreciated that the measurement used to control and correct strip shape can be used to modify one or more conrolling factors relating to the pressure-applying rolls preceding or succeeding the rolls 2 where such are provided.

As mentioned above, the rollers 5 move up and down to take up variations in the deflections produced in the strip according to variations in the shape thereof.

It will be appreciated therefore that such movements of the rollers may themselves be used to provide a measure of the localised deflections.

One way of achieving this is illustrated in FIGS. 2, 3 and 4. In this case, the rollers 5 of the previous example are replaced by a plurality of roller bearings 10 carried on a common stationary shaft 11 extending below and across the width of the strip 1. Each roller bearing 10 has an inner race 12 fixedly carried on the shaft 11 and an outer race 13 with needle rollers 14 between the inner and outer races. The strip 1, which is under tension, is deflected upwardly to a small degree as it passes over the roller bearings, as indicated by comparison with the dotted line A in FIG. 3, so as to exert a force on the bearings 10 and so that the bearings 10 exert a reactionary force upwardly on the strip 1. In practice, the shaft 11 could be disposed between a pair of pass-line rolls 3a indicated in dotted lines in FIG. 2. Each inner race 12 is of reduced thickness opposite the location where the associated outer race 13 bears against the strip 1 to provide a thin wall portion 15 which is produced by forming a slot 16 in the wall of the inner race which slot extends parallel to the axis thereof. The slot 16 opens to the interior of the inner race 12 through a centrally disposed aperture 17 which opens to a diametral bore 18 in the shaft 11. There is thus a bore 18 associated with each roller bearing 10 and these bores 18 open at their lower ends to a common channel 19 formed in the shaft 11 and extending in the direction of length thereof. Within each bore 18 is located a displacement sensor which may take any suitable form but which in this example comprises a spindle 20 which extends through the aperture 17 and is resiliently urged into engagement with the thin wall portion 15 to follow deflections thereof. The spindle 20 extends into a barrel 21 carrying a winding (not shown) whereby voltage variations are produced as a function of the displacement of the spindle 20 which voltage variations are led out through leads 22 extending through the channel 19.

In the operation of the arrangement described, the strip 1 is advanced under tension over the roller bearings 10. The strip is locally deflected by the reactionary forces of the bearings 10 according to the local tension existing in the strip with corresponding deflections of the thin wall portions 15 of the inner races 12. These deflections are sensed by the spindles 20 and transformed into electrical signals and appear in the leads 22 which are led out from the end of the shaft 11 through the channel 19. These electrical signals provide a measure of the shape of the strip and may be compared to provide a measure of the tension inequalities existing across the width of the strip or they can be scanned sequentially to provide information as to the location of the defect in the strip across the width thereof and also the magnitude thereof. This information can then be used to modify one or more of the controlling factors to reduce the defect appearing in the strip.

FIGS. 5 and 6 illustrate schematically one way in which this can be achieved. As shown in FIG. 5, the output from each displacement sensor D is fed to a scanning device 23 which could incorporate a simple uniselector type switch and which scans the outputs sequentially across the width of the strip and which also operates to provide a signal representing the average value of the outputs for the immediately preceding scan. The averaging device is represented by the block 24. The average value and each individual value are supplied to a dividing device 25 to derive a signal representing the ratio of the actual value to the average value. This ratio signal is supplied in parallel through separate scanners 26 and 27 to mimic display 28 and a chart recording device 29. The scanners 26 and 27 operate in synchronism with the scanning device 23 to allocate the ratio signals to channels corresponding to the positions across the width of the strip from which the signals are derived. The mimic display 28 can be a visual device which enables the operator visually to inspect the shape of the strip at any time. It can, for example, provide a separate strip of illumination for each channel of a height representing the amplitude of the associated ratio signal so that any defect of shape in the strip 1 is seen by comparing the amplitudes or heights of the respective illuminated strips. The ratio signals are also supplied to a control logic network 30 which samples the ratio signals for each scanning period and by the inbuilt logic circuitry initiates an output signal to one or more output lines 31 connected respectively to roll force controlling means 32, roll bending means 33, strip tension controlling means 34 and oil coolant flow control means 35 (i.e., thermal camber control means) to modify one or more of the controlling factors in the sense to reduce the defect in the shape of the strip and more nearly to equalise the ratio signals in the respective channels.

FIG. 6 shows a very simple circuit for scanning the channels by the scanner 23 and deriving the average value of the preceding scan. Each electrical signal from the displacing sensing devices indicated at D is fed to a separate capacitor 36 which is charged accordingly and which is connected to terminals 37 of switches 38 and to separate terminals 39 of a uniselector 40. The first terminal of the uniselector 40 is blank and when it is in this position all the switches 38 are closed so that all the capacitors 36 are connected to a further capacitor 41 which is charged up to a value representing the average value of the displacement signals from the respective sensors D. This average value signal is supplied through an amplifier 42 to the dividing device 25. As the uniselector 40 moves around its associated contacts it successively applies the displacement signals from the sensors D to the dividing device 25 so that the output from the latter is a series of signals representing the ratio of each displacement signal with respect to the mean value of the displacement signals from the immediately preceding scan.

It will be appreciated that the arrangement described with reference to FIGS. 2, 3 and 4 may be modified to more closely approach that described with reference to FIG. 1 by omitting the displacement sensing means and measuring the angular velocity imparted to the outer race 13. This could be done, for example, by providing each outer race 13 with a magnetic marker and providing one or more magnetic reading heads in proximity to the outer race to produce a number of pulses per revolution of the outer race representing the angular velocity thereof.

It will also be appreciated that only a minimum of two measurements across the width of the strip 1 are essential although more are preferred. However, in order to minimise or prevent marking of the strip 1, it is desirable that the surface presented by the outer races 13 should be fairly continuous across the width of the strip 1. Thus, the shaft 11 may carry some roller bearings which are not active in measuring strip deflection but merely function to provide continunity of the surface on which the strip 1 bears.

The arrangement described with reference to FIGS. 2, 3 and 4 can be modified by substituting fluid film bearings for the roller bearings 14. This has the advantage that the inner race 12 is no longer required as such and the pressure of the fluid film can be used to derive a measure of the local deflection of the strip so that the deflection sensing means 20 and 21 may also be omitted. An example of such a modified arrangement is shown in FIGS. 7 and 8 in which air bearings are used although liquid bearings could also be employed. In this example, there is provided a fixed stationary shaft 50 extending below and across the width of the strip 1 and carrying a jet ring or sleeve 51 which may be split along a diameter for ease of assembly. A number of outer races 52 are rotatably mounted on the ring 51 in side-by-side relationship. As in the previous example, the strip 1 is deflected upwardly to a small degree as it passes over the races 52 and experiences a reactionary force from the races. The races 52 are each supported on a cushion of air under pressure provided by pairs of supply jets 53 disposed equiangularly about the axis of the shaft 50. Thus for each race 52 there are several pairs of jets 53 and 6 pairs are illustrated, the two jets 53 of a pair being spaced in a direction parallel to the axis of the shaft 50. One pair of supply jets 53 for each race is disposed below the location at which the strip 1 bears on the race 52 and a separate sensing jet 54 is disposed substantially midway between such pair of supply jets 53. The pairs of supply jets 53 for each race 52 form two sets of axially spaced jets. The jets 53 in each set open to a common annular supply channel 56 formed in the inner wall of the sleeve 51. Air under pressure is fed to the supply jets 53 by pipes 55 extending lengthwise of the shaft 50 and opening to the appropriate annular supply channel 56. Separate pipes 57 are connected to each sensing jet 54 and lead out at the end of the shaft 50. The pipes 55 and 57 extend through longitudinal bores in the wall of the sleeve 51 and where they cross the annular supply channels 56 appropriate sealing is provided to ensure that the channels 56 are not in free communication with each other through such bores. Each pipe 57 is connected to a separate pressure transducer (not shown) which provides an electrical output signal representing the fluid pressure existing in the space between the associated race 52 and the ring 51 and sensed by the associated jet 54.

In the operation of the arrangement described, it will be appreciated that under no load conditions the air supplied under pressure to the jets 53 will maintain the races 52 coaxial with the shaft 50. The pressures sensed by the sensing jets 54 and the outputs from the corresponding transducers will then be some constant value representing this condition and if desired, this value may be ascertained and used to provide a biassing signal reducing the outputs to zero representing no load conditions. If a load is now applied by the strip, and assuming a constant common supply pressure, any tension inequalities in the strip will result in the races 52 being deflected to correspondingly different degrees thus modifying the pressures sensed by the sensing jets 54 and hence the corresponding output signals. These output signals can be scanned and utilised in the same manner as is described with reference to FIGS. 5 and 6, the displacement sensors D being considered to be the pressure transducers of the present example.

In the arrangement described, the races 52 are closely spaced and the small thrust between them is supported by air escaping from the space between the races 52 and the shaft 50. If desired, this may be supplemented by additional air jets directed upwards at the strip 1 in the small gap between each race 52 so as to provide a continuous support, particularly when the rings rise eccentrically to follow slack areas in the strip 1.

In the fluid film bearing arrangement described, it will be appreciated that an increase in the pressure of the air supplied to the supply jets will result in a greater resistance to displacement by the races 52 for a given load. Such resistance to displacement is referred to as the stiffness of the bearing, and this stiffness may be controlled by controlling the air supply pressure to suit any conditions which may be encountered. It enables the air supply pressure to be selected to be such that the displacement of the races 52 becomes minimal although still measurable so as to reduce any danger of the displacement of the races 52 marking the strip. This danger can be even further reduced by modifying the arrangement in such a way that the races are substantially maintained in a constant position relative to the shaft 50 by continuously modifying the air supply pressure to each race to achieve this result and using the magnitude of the modification of the air supply pressure to provide the measuring signal. Such an arrangement is shown schematically in FIG. 9. In this case, air is supplied from a pressure source (not shown) along line 60 to a pneumatic relay 61 which controls the pressure of the air supplied to the supply jets 53. A displacement sensing device, in this example, a jet 62 replaces the sensing jet 54 of the previous example and operates as is explained below to provide a measure of the gap between the race 52 and the ring 51. This gap measurement is translated into an electrical signal by a detector 63 (which may be a pressure transducer) and is supplied to a summing element 64 which also receives a reference signal along line 65. The arrangement shown is in effect a push-pull arrangement and the jet 62 is duplicated and at a location diametrically opposite that at which the strip 1 bears on the race 2 and a corresponding detector 66 is provided to supply a gap size signal to the summing element 64. Thus if the load imposed by the strip 1 on the race 52 increases, the gap size at the top of the race tends to decrease and that at the bottom of the race to increase with corresponding variations in the signals supplied by the detectors 63 and 66 to the summing element 64. The reference signal supplied along line 65 is common to that provided for each race 52 and is a function of the tension applied to the strip. Thus, assuming no defects in the strip shape, the tension in the strip will displace the race 52 to reduce the gap size at the top and increase the gap size at the bottom whatever the air pressure supplied to the supply jets 53. Under these conditions which may be considered to the datum conditions, there is always a difference between the signals supplied by the detectors 63 and 66 and this difference is compensated by the reference signal along line 65 so that the output from the summing element 64, which is an error signal, is zero under such datum conditions. Any local changes in the strip tension result in a corresponding change in the gap size which is sensed by the corresponding detectors 63 and 66 to produce an error signal from the associated summing element 64 which error signal is supplied through an amplifier 67 to control the pneumatic relay 61 to vary the pressure of the air supplied to the jets 53 in the sense to reduce the change in gap size. Thus, if the local tension in the strip 1 increases, the gap size at the top of the race 52 tends to decrease and an error signal is produced which controls the pneumatic relay 61 in the sense to increase the air pressure to the supply jets 53 and oppose such displacement. The change in the air pressure supplied to jets 53 is thus a measure of the change in the local tension of the strip. The air pressure supplied to the supply jets 53 is sensed by suitable means, e.g., a pressure transducer 68, the electrical output from which along line 69 represents the tension in the strip 1 sensed by the race 52 and corresponds to the outputs from the displacement sensors D in FIGS. 5 and 6. The outputs along the lines 69 associated one with each race 52 are then scanned and used to modify one or more of the controlling factors and to provide a measure of the strip shape in the manner described with reference to FIG. 5.

The gap sensing device may take any suitable form. In the example described with reference to FIG. 9 it is described as a jet 62 and the arrangement is shown in greater detail in FIG. 10. In this arrangement air is supplied under a constant pressure along pipe 70 through a restriction 71 to a chamber 72 communicating with the jet 62. Because of the restriction 71, the air pressure in the chamber 72 is a function of the resistance offered to the escape of air from the jet 62 and hence a function of the gap size. Thus, in this example, the detectors 63 and 66 may be considered to be pressure transducers which produce an output signal as a function of the air pressure in the associated chamber 72.

It will be appreciated that such an arrangement could be used to replace the supply jets 53 in the example using constant air pressure described with reference to FIGS. 7 and 8 so that the sensing jets 54 may be omitted.

An alternative gap sensing device is shown in FIG. 11. This comprises a metal disc 73 sitting on an electrically insulating pad 74 in a recess in the sleeve 51 with a lead 75 connected to the disc 73 and running to the associated detector 63 or 66 or directly to the summing element 64. It operates on the capacity principle, the disc 73 being one plate of a displacement sensing capacitor and the opposed face of the race 52 acting as the other plate. This arrangement can be further modified by locating the disc 73 around the outlet of a supply jet 53. In this case the jet 53 is formed in a cylinder 76 of electrically insulating material fitted into a bore 77 in the sleeve 51, the disc 73 having a central aperture which is the outlet for the jet 53. The lead 75 taken from the disc 73 is taken out through a bore in the cylinder 76.

It is to be understood that the invention is of application in determining the flatness or shape of sheet or strip material which is under tension but which is not necessarily being advanced. Thus the sheet may be placed on a stretcher so that it is under tension and the deflections resulting from the applied forces may be measured as described. Clearly, those embodiments in which rollers are driven by the advance of the sheet or strip and the resulting speed of rotation of the rollers is measured are excluded from such application.

Although the rollers or the force applying means are described as being spaced across the width of the sheet or strip, they are not necessarily disposed on a common line normal to the direction of length or advance of the sheet or strip but they can also be spaced in the direction of length or advance of the sheet or strip so as to be spaced in both directions.

We claim:

1. A method of measuring the flatness of sheet material under tension which comprises applying forces to the sheet by fluid film bearings having an inner race fixedly carried on a shaft and an outer race urged into engagement with the sheet material by fluid under pressure and deriving a measure of the deflection of the outer race by measuring the fluid pressure existing between the inner and outer races.

2. A method according to claim 1 wherein the pressure of the fluid is modified in the sense to reduce deflections of the outer race resulting from tension inequalities in the sheet and measuring the modified fluid pressure.

3. A method according to claim 1 applied to the control of the flatness of sheet material produced by passing the material through the bites of pairs of spaced co-operating rolls in which the measure of the deflection of the outer race is utilized to modify at least one of the controlling factors of one of said pairs of spaced co-operating rolls in the sense to compensate for such deflection.

4. Apparatus for measuring the flatness of sheet material under tension comprising means operable to apply to the sheet at at least two locations a force having at least a component substantially normal to the general plane of the sheet to reduce tension inequalities therein and locally to deflect the sheet, and each force applying means comprises a separate rotatable means applied at each location in contact with the sheet, and wherein each force applying rotatable means comprises a fluid film bearing having an inner race and an outer race contacting the sheet and means is provided for the supply of fluid under pressure to maintain the outer race in spaced relationship to the inner race.

5. Apparatus according to claim 4 including means for sensing the displacement of the outer race relative to the inner race.

6. Apparatus according to claim 5 wherein the sensing means comprises a pressure sensing jet opening to the space between the inner and outer races.

7. Apparatus according to claim 6 including a separate pressure transducer associated with each sensing jet and operable to produce an electrical signal as a function of any displacement of the outer race relative to the inner race.

8. Apparatus according to claim 6 wherein each sensing jet opens to a chamber which communicates through a restriction with a source of fluid under pressure and means is provided to derive a measure of the fluid pressure in said chamber.

9. Apparatus according to claim 5 wherein the displacement sensing means is a capacitor device.

10. Apparatus according to claim 9 wherein the capacitor device comprises a first plate carried on the inner race below the location of the contact of the outer race with the sheet, the outer race providing a second plate for the device.

11. Apparatus according to claim 4 wherein the pressure supply means comprises a plurality of supply jets opening to the space between the inner and outer races and disposed about the axis of the inner race.

12. Apparatus according to claim 11 including means for supplying fluid under substantially constant pressure to said supply jets.

13. Apparatus according to claim 11 including means for supplying fluid under pressure to said supply jets and means responsive to the deflection of the sheet to modify said supply pressure in the sense to reduce said deflection.

14. Apparatus according to claim 13 including means for deriving a measure of said modified supply pressure.

15. Apparatus according to claim 4 applied to the control of the flatness of sheet material produced by passing the material through flatness controlling means said means including a pair of co-operating rolls and a further pair of co-operating rolls spaced from said pair of co-operating rolls, said further pair of co-operating rolls being spaced from said pair of co-operating rolls in the direction of travel of the sheet, and means responsive to the localized deflections of the sheet to modify at least one of the controlling factors of one of said pairs of co-operating rolls in the sense to compensate for difference in the deflection at said two locations.

16. Apparatus for measuring the flatness of sheet material under tension comprising means operable to apply to the sheet at at least two locations a force having at least a component substantially normal to the general plane of the sheet to reduce tension inequalities therein and locally to deflect the sheet, and each force applying means comprises a separate rotatable means applied at each location in contact with the sheet, and wherein each force applying rotatable means comprises a fluid film bearing having an inner race and an outer race contacting the sheet and including means for applying fluid under pressure through supply jets formed in the inner race to the space between the inner and outer races to maintain the races in spaced relationship, means for sensing displacement of the outer race resulting from variations in the local tension of the sheet to produce a corresponding signal, means responsive to said signal to modify the pressure of said fluid in the sense to reduce such deflections and means for measuring the modified fluid pressure.

17. A method of measuring the shape of sheet material under tensions which comprise urging into engagement with the sheet at at least two spaced locations a floating member supported by a fluid pressure in spaced relationship to a fixed member relative to the fixed member.

18. A method of measuring the shape of sheet material under tensions which comprise urging into engagement with the sheet at at least two spaced locations a floating member supported by a fluid pressure in spaced relationship to a fixed member and measuring the fluid pressure.

References Cited

UNITED STATES PATENTS

| | | | |
|---|---|---|---|
| 2,345,765 | 4/1944 | Michel | 72—205 |
| 2,674,127 | 4/1954 | Garrett et al. | 73—159 |
| 2,809,519 | 10/1957 | Kaestner | 73—159 |
| 3,078,747 | 2/1963 | Pearson | 72—9 |
| 3,334,508 | 8/1967 | Martin | 72—364 |

FOREIGN PATENTS

| | | |
|---|---|---|
| 946,342 | 1/1964 | Great Britain. |
| 1,469,660 | 1/1967 | France. |

MILTON S. MEHR, Primary Examiner

U.S. Cl. X.R.

73—159; 226—45, 195